United States Patent [19]
Moore et al.

[11] Patent Number: 5,162,014
[45] Date of Patent: Nov. 10, 1992

[54] MAGNETIC TREATING OF HONEYBEES INFESTED WITH MITES OR OTHER PARASITES

[76] Inventors: Lawrence W. Moore; William I. Moore, both of R.D. 1, Box 977, Reading, Pa. 19607

[21] Appl. No.: 695,510

[22] Filed: May 3, 1991

[51] Int. Cl.5 .................. A01K 47/06; A01K 51/00
[52] U.S. Cl. ........................................... 449/2; 449/3; 449/42
[58] Field of Search .............. 449/2, 3, 20, 26, 32, 449/42, 50

[56] References Cited

U.S. PATENT DOCUMENTS 2,806,082  9/1957  Woods .......................... 449/3 X
4,739,531  4/1988  Robson .......................... 449/20 X

FOREIGN PATENT DOCUMENTS 1304793  4/1987  U.S.S.R. .......................... 449/20

*Primary Examiner*—Robert P. Swiatek
*Attorney, Agent, or Firm*—Webb, Burden, Ziesenheim & Webb

[57] ABSTRACT

A method for treating honeybees for mite or parasite infestation by exposing the hive to a magnetic field which is limited but which is still greater than two orders of magnitude stronger than the magnetic field of the earth. Such a magnetic field combats the mite or parasite infestation, but the magnetic field is not so strong as to affect the viability of the bees themselves.

2 Claims, 1 Drawing Sheet

MAGNETIC TREATING OF HONEYBEES INFESTED WITH MITES OR OTHER PARASITES

FIELD OF THE INVENTION

Magnetic fields are used to defeat mites and other parasites in honeybees and other insects.

BACKGROUND OF THE INVENTION

"The damage caused by tracheal mites has eclipsed all other bee-keeping problems in the area where I live," says Kirk Webster, "Honey Bee Breeding in the Northeast—Starting Again," *American Bee Journal*, p. 20, Jan., 1991. "Despite treating . . . with menthol, half of my colonies were either dead or had clusters of insignificant size by the first week of May last spring" Ibid., p. 20. Mr. Webster's plea is for selective bee breeding to be conducted to obtain bees which can thrive even when affected with tracheal mites, because the use of chemicals to treat mites in bees can easily backfire and destroy the honey market, a market in which quality and purity are of the utmost importance.

Mr. Webster is not alone in his appreciation of the urgent bee-keeping problem of tracheal mite infestation. Honeybees throughout the United States, particularly in the Northeastern United States, are being infested with the parasitic mite *Acarapis woodi Rennie* that has already killed millions of honeybees and is threatening to kill millions if not billions more. Alarmingly, in 1989 bee u keepers lost up to 80% of their colonies to tracheal mites (Moses, L., "Tracheal Mite Hurts Bee Keeping," *Fruit Grower*, Mar., 1990, p. 9). Other types of mites are starting to appear also. Moreover, fruit and vegetable growers are beginning to come forward in increasing numbers to point out that their crops are suffering from a lack of pollinators (honeybees).

Chemical treatments intended to combat tracheal mite infestation in bees have been attempted, but the results have generally been unsatisfactory. Menthol treatment, in particular, has been widely attempted to combat *Acarapis woodi Rennie* infestation, but the effects have been limited and even in small quantities menthol contamination of bee hives produces commercially unacceptable honey products. For reasons of honey contamination and also other ecological reasons, the use of chemicals less "natural" than menthol has an even worse chance of success. Other than chemical treatment, those skilled in the art have tried only the use of the selective breeding discussed by Mr. Webster as a means to cope with a problem which will otherwise soon decimate North America's bees.

Ideally, a solution to the tracheal mite problem in bees would be a bee-treating method in which no chemicals were used and nothing complicated along the lines of selective breeding would be required.

SUMMARY OF THE INVENTION

In order to meet this need, the present invention is a method for treating bees for mite or parasite infestation by exposing the hive to a magnetic field which is limited but which is still several orders of magnitude stronger than the magnetic field of the earth. Such a magnetic field combats the mite or parasite infestation, but the magnetic field is not so strong as to affect the viability of the bees themselves.

DETAILED DESCRIPTION OF THE INVENTION

Tracheal mites such as *Acarapis woodi Rennie* enter a bee (host) by way of the vestibule of the prothoracic spiracle, and then into the trachea (breathing tubes). Upon entering the trachea, the mated female mite begins to raise a family of mites. Reportedly as many as six eggs are laid in the first twelve days of infestation. The eggs hatch and the family resides inside the bee trachea until the bee dies—the mites puncture the trachea wall and suck blood from the bee—and after the bee's death the mated females seek another host.

Basically, the invention resides in the exposure of bee hives to limited magnetic fields which are still greater than two orders of magnitude stronger than the magnetic field of the earth, for the purpose of affecting the mite infestation without otherwise affecting the bees. Details as to how to implement magnetic treatment of hives are presented below.

In order to debilitate the tracheal mites without affecting the viability of the bees, the present invention embraces the subjecting of bees, mite infestation status known or unknown, to a magnetic field greater than two orders of magnitude stronger than the magnetic field of the earth, preferably at least 100 gauss, and more preferably created with permanent magnets or magnetic tape having a strength between 1,600–2,800 gauss per $cm^3$. Magnetic treatments of this magnitude should continue for at least 15 days, although a 22–24 day treatment duration is preferable as this represents the bee's normal life cycle.

Such a magnetic field may be created with electromagnets, permanent magnets, or other means known in the art for inducing magnetic fields. One particularly well-suited technique is to affix magnetic tape to the appropriate intra-hive structures. One example of such a tape is a flexible bonded magnetic material containing barium ferrite in a polymer binder, which is manufactured to be permanently magnetic. The tape has a thickness of 0.055 cm with a gauss strength of 1,890 per $cm^3$ magnetized 11 PPI. Comparable tapes with an adhesive backing, 0.060 cm in thickness, can also be used but are not recommended because the adhesive is superfluous in prolonged outdoor use. Magnetic tapes are preferably installed with a compressed air staple gun, although other staple guns and bonding methods may less preferably be used.

Figure 1:
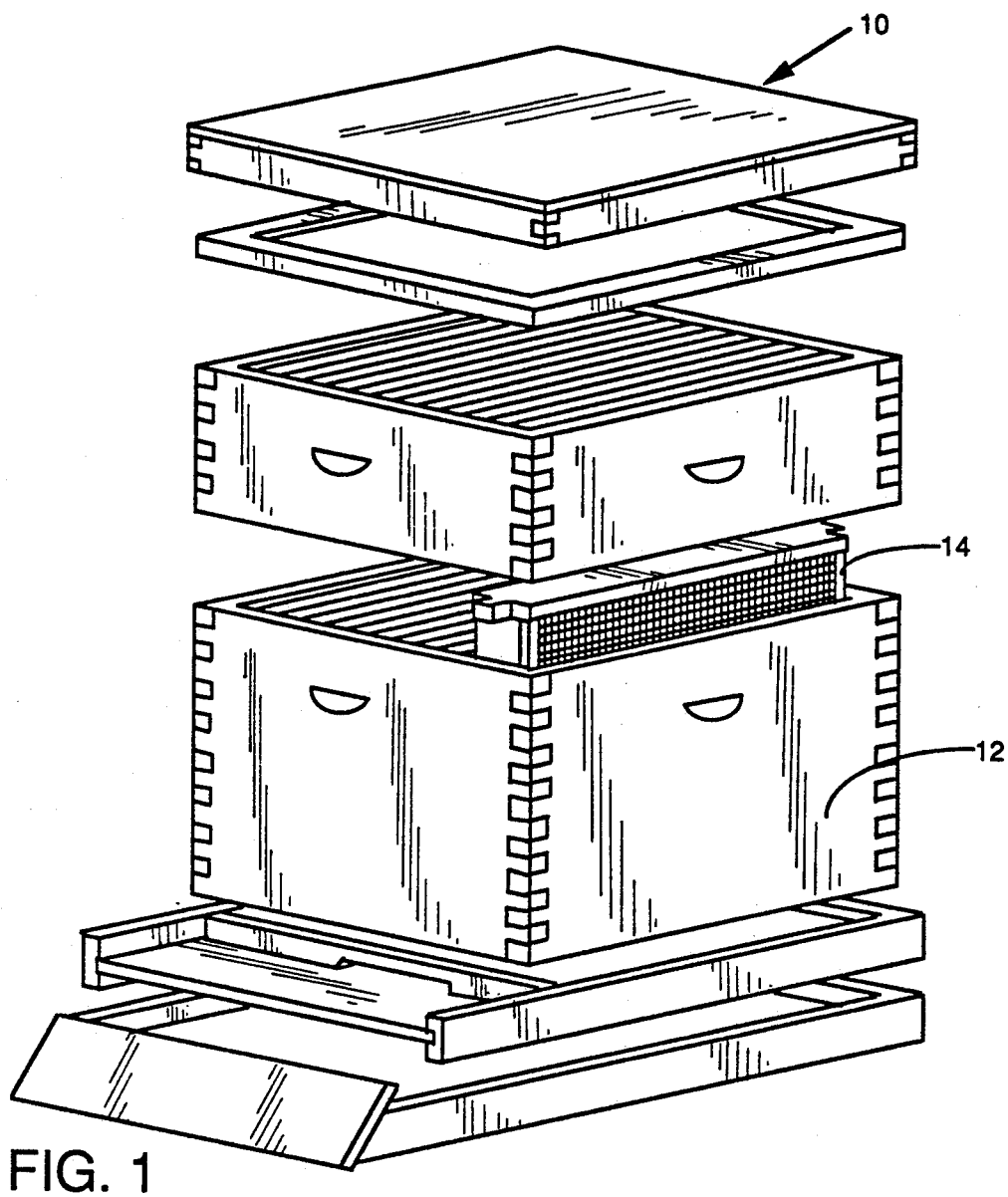
FIG. 1 illustrates a perspective view, exploded, of a hive.

FIG. 1 illustrates an exploded view of a hive 10 which includes large wired brood foundations, or drawn combs, near its base. A single, partially withdrawn drawn comb 14 is shown protruding from the hive body 12. It is the drawn comb 14 to which magnets are preferably attached to create the magnetic field according to the present invention. Other structures of the hive body 12 are those known in the art.

Figure 2:
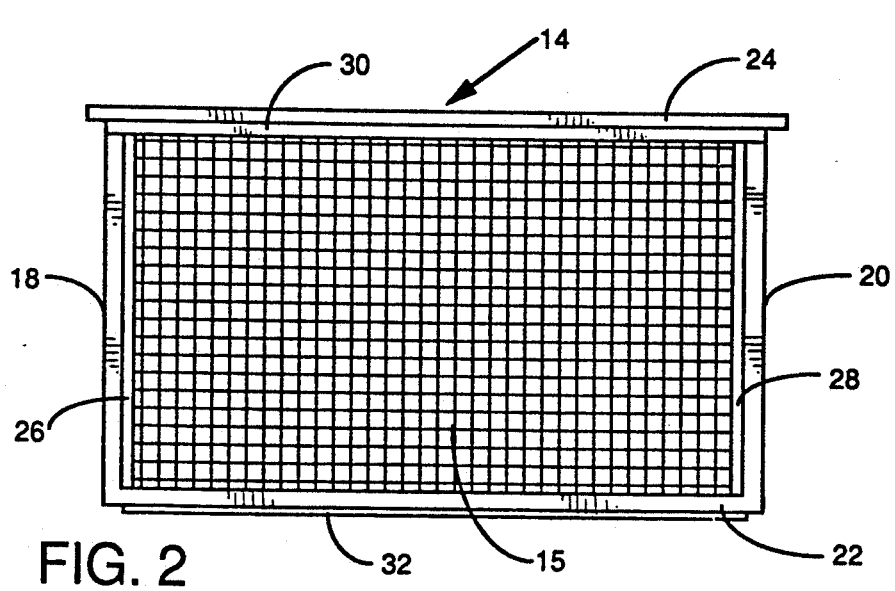
FIG. 2 illustrates a portion of the hive of FIG. 1 to which, in the preferred embodiment of the invention, magnets are attached.

In FIG. 2, a plan view of the drawn comb 14 is illustrated. The drawn comb 14 of FIG. 1 has two frame upright members 18 and 20 (left and right), a bottom frame strut member 22 and a top support rail member 24. In the preferred embodiment as shown in FIG. 1, four magnetic strips are installed on the frame members 18, 20, 22 and 24 of the drawn comb 14, and furthermore the strips are placed in specific preferable positions. On the left frame member 18 the magnetic strip 26 is installed by stapling it to the face of the left frame member 18 which is perpendicular to the central body 15 of the drawn comb 14. On the right frame member 20 the magnetic strip 28 is installed by stapling it to the face of the right frame member 20 which is perpendicular to the central body 15 of the drawn comb 14. The top support rail member 24 has a magnetic strip 30 attached to the surface of the rail member 24 which is parallel to the surface of the central body 15 of the drawn comb 14. Along the bottom frame strut member 22, the magnetic strip 32 is mounted at the bottom, so that the magnetic strip 32 is exposed between the drawn comb 14 and the base of the hive body 12. The tapes shown in FIG. 1 are ½ inch in width. The central body 15 can be wire mesh as illustrated, but can also be plastic or any number of materials known in the art for the construction of drawn combs.

Referring once again to FIG. 1, although there are other sections in the hive body 12 to which permanent magnets or other magnetic field inducers could conceivably be placed, the inventors have identified that providing magnetic fields in the areas of the repeating sections of drawn comb 14 is all that is necessary to control tracheal mites in honeybees.

Although particular magnetic tape has been shown installed against the frame of the drawn comb 14 in FIGS. 1 and 2, other magnetic constructs are feasible as long as a magnetic field of the gauss range disclosed above is created at the location of or in the immediate vicinity of the bee hive and/or in the drawn comb area of the hive.

Bee hives constructed according to FIGS. 1 and 2 and according to the description above were deployed and observed, and during treatment periods for a minimum of 22 days all hives displayed normal bee activity and populations did not show any indications of decline during treatment duration. These test results were encouraging considering that the geographic region (Pennsylvania) had already suffered pernicious tracheal mite infestations in virtually all bee populations.

It is possible to install magnetic material in existing hives, with the bees present, with the aid of a smoker and other tools and techniques of standard bee keeping. Since magnetism does not contaminate the beeswax or honey or by-products thereof, magnetic material may remain in the hives permanently and thus may provide year-to-year protection against mite infestation.

In order to derive the gauss strength of the magnetic fields which accomplish the mite control of th present invention, various magnetic field strengths were tested. The various magnetic field strengths tested were compared and the above-described quantification of magnetic field strength was derived. A 100 gauss magnetic field has been observed, under a microscope to kill an *Acarapis woodi Rennie* mite.

The invention will be more completely described with reference to the following examples.

EXAMPLE 1

A bee colony having 90% tracheal mite infestation on Dec. 4, 1990, after exposure to a continuous magnetic field, created with two 16 inch and two 7½ inch magnetic tapes of 1,890 gauss per $cm^3$ each, over an approximate 2 month period, was observed after sampling and dissection to have a mite infestation which had been reduced to 70%. Tapes 16 and 7½ inches in length fit a standard sized drawn comb. Also, individually infested bees had fewer mites per trachea at the completion of the test than they had at the start of the test. This experiment proves that magnetism reduces/controls tracheal mite infestation in honeybees.

EXAMPLE 2

Comparative tests were performed in which various magnetic field strengths were used to treat separate and distinct hives. Some hives were treated with higher and some with lower magnetic field strengths. It was observed that bee colonies having a 20–25% infestation rate are viable, surviving colonies, even though higher magnetic fields reduced mite infestation to zero.

CONCLUSION

Although the invention has been described with particularity above, the scope of the invention is only to be limited insofar as is set forth in the accompanying claims.

We claim:

1. A method for treating insects comprising creating a magnetic field in the vicinity of a bee, said magnetic field having its origin in a permanent magnet of at least 100 gauss and further wherein said permanent magnet takes the form of at least one magnetic strip mounted to at least one drawn comb of a bee hive, wherein said magnetic field has strength both adeaquate to mitigate the infestation of any parasites which may be present within said bee and limited enough to preserve the viability of said bee.

2. An apparatus for controlling parasitic infestation of bees, comprising: a bee hive having at least one drawn comb therein and at least one permanent magnet having the form of a magnetic strip mounted on said at least one drawn comb.

* * * * *